United States Patent [19]
Heil et al.

[11] Patent Number: 5,392,407
[45] Date of Patent: Feb. 21, 1995

[54] MULTI-PORT PROCESSOR WITH PERIPHERAL COMPONENT INTERCONNECT PORT AND RAMBUS PORT

[75] Inventors: Thomas F. Heil; Craig A. Walrath; Jeff A. Hawkey, all of Easley; Jim D. Pike, Greenville, all of S.C.

[73] Assignee: NCR Corporation, Dayton, Ohio

[21] Appl. No.: 996,276

[22] Filed: Dec. 24, 1992

[51] Int. Cl.⁶ .......................................... G06F 13/364
[52] U.S. Cl. ................................. 395/325; 370/85.2; 364/242.6; 364/242.92; 364/240; 364/240.2; 364/241.9; 364/DIG. 1
[58] Field of Search ............... 395/325, 725, 425, 800, 395/275, 650; 365/230.01; 370/85.9, 85.1, 85.2; 340/825.5

[56] References Cited

U.S. PATENT DOCUMENTS

| | | | |
|---|---|---|---|
| 4,133,028 | 1/1979 | Bernstein | 364/200 |
| 4,454,591 | 6/1984 | Lou | 395/325 |
| 4,470,113 | 9/1984 | Oura | 364/200 |
| 4,891,754 | 1/1990 | Boreland | 364/200 |
| 4,901,230 | 2/1990 | Chen et al. | 364/200 |
| 4,939,637 | 7/1990 | Pawloski | 364/200 |
| 5,202,970 | 4/1993 | Schiffleger | 395/425 |
| 5,230,067 | 7/1993 | Buch | 395/275 |
| 5,305,443 | 4/1994 | Franzo | 395/325 |

FOREIGN PATENT DOCUMENTS

| | | | |
|---|---|---|---|
| 0473280 | 3/1992 | European Pat. Off. | G06F 13/40 |
| 0503850 | 9/1992 | European Pat. Off. | G06F 13/40 |

OTHER PUBLICATIONS

*Computer Design*, "PCI Promises Solution to Local-Bus Bottleneck", vol. 31, No. 8, Aug. 1992, pp. 36–40, Authored by W. Andrews.

*Electronic Design*, "Local-Bus Battle Lines Are Drawn At Comdex," vol. 40, No. 23, Nov. 12, 1992, pp. 55–58, Authored by R. Nass.

*Primary Examiner*—Gopal C. Ray
*Attorney, Agent, or Firm*—George H. Gates; Paul J. Maginot

[57] ABSTRACT

A dual-port processor architecture wherein a first port interfaces to a PCI bus and a second port interfaces to a RAMBUS channel.

18 Claims, 8 Drawing Sheets

MULTI-PORT PROCESSOR WITH PERIPHERAL COMPONENT INTERCONNECT PORT AND RAMBUS PORT

BACKGROUND OF THE INVENTION

Cross-Reference to Related Applications

This application is related to:

Application Ser. No. 07/997,427, entitled "Peripheral Component Interconnect 'Always On' Protocol," filed on same date herewith by T. Heil, and assigned to the assignee of this application;

Application Ser. No. 07/996,278, entitled "Peripheral Component Interconnect Special Cycle Protocol Using Soft Message IDs," filed on same date herewith by T. Hell, and assigned to the assignee of this application; and application Ser. No. 07/996,277, entitled "Peripheral Component Interconnect In Concurrent Architectures And As A Main Memory Bus," filed on same date herewith by T. Hell et al. and assigned to the assignee of this application.

All of the above-identified applications are incorporated by reference herein.

FIELD OF THE INVENTION

This invention relates in general to computer input/output (I/O) device interfaces, and in particular to a computer I/O bus.

DESCRIPTION OF RELATED ART

A communications interface or input/output bus is typically used in computer systems to interconnect separate devices, such as processors, memories, and peripherals. Standardized interfaces such as the ISA, EISA, or Micro Channel TM buses have long been used in computer systems to provide a common I/O board interface across different platforms and different processor generations. However, there are a number of problems associated with these interfaces.

The main problem with these prior interfaces involves cost. Most performance critical peripherals are being moved to motherboards, not only for the performance advantages of processor proximity and minimal interconnect length, but also to leverage the cost and space advantages of higher levels of integration. However, complete integration with the resultant cost and space savings is hampered by lack of a standard component interconnect and the necessity of "glue logic" to connect to the variety of processors and peripheral devices to buses.

Another problem with these prior interfaces involves performance constraints. Standard I/O expansion buses are performance limiting, due to general access latency and the severe bandwidth constraints felt by high performance devices, particularly graphics devices and future communication devices such as fiber LANs.

Further, as highly integrated, performance critical peripheral controllers migrate closer to the processor, there is significant pressure to put them on the "processor treadmill." In other words, these parts are under pressure to track the frequent changes in processor bus frequencies, widths, protocols (e.g., bursting), and signalling standards (e.g., 3 volts). Unnecessarily placing peripheral parts on this treadmill increases system costs and delays the availability of leading edge systems.

Still another problem with prior interfaces involves reliability. As the industry moves toward distributed processing, client systems will become a reliability burden (the weak link) in distributed systems, and therefore will be under pressure to offer levels of reliability and fault containment previously reserved for larger server systems.

SUMMARY OF THE INVENTION

To overcome the limitations in the prior art described above, and to overcome other limitations that will become apparent upon reading and understanding the present specification, the present invention discloses a dual-port processor architecture wherein a first port interfaces to a PCI bus and a second port interfaces to a RAMBUS channel.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
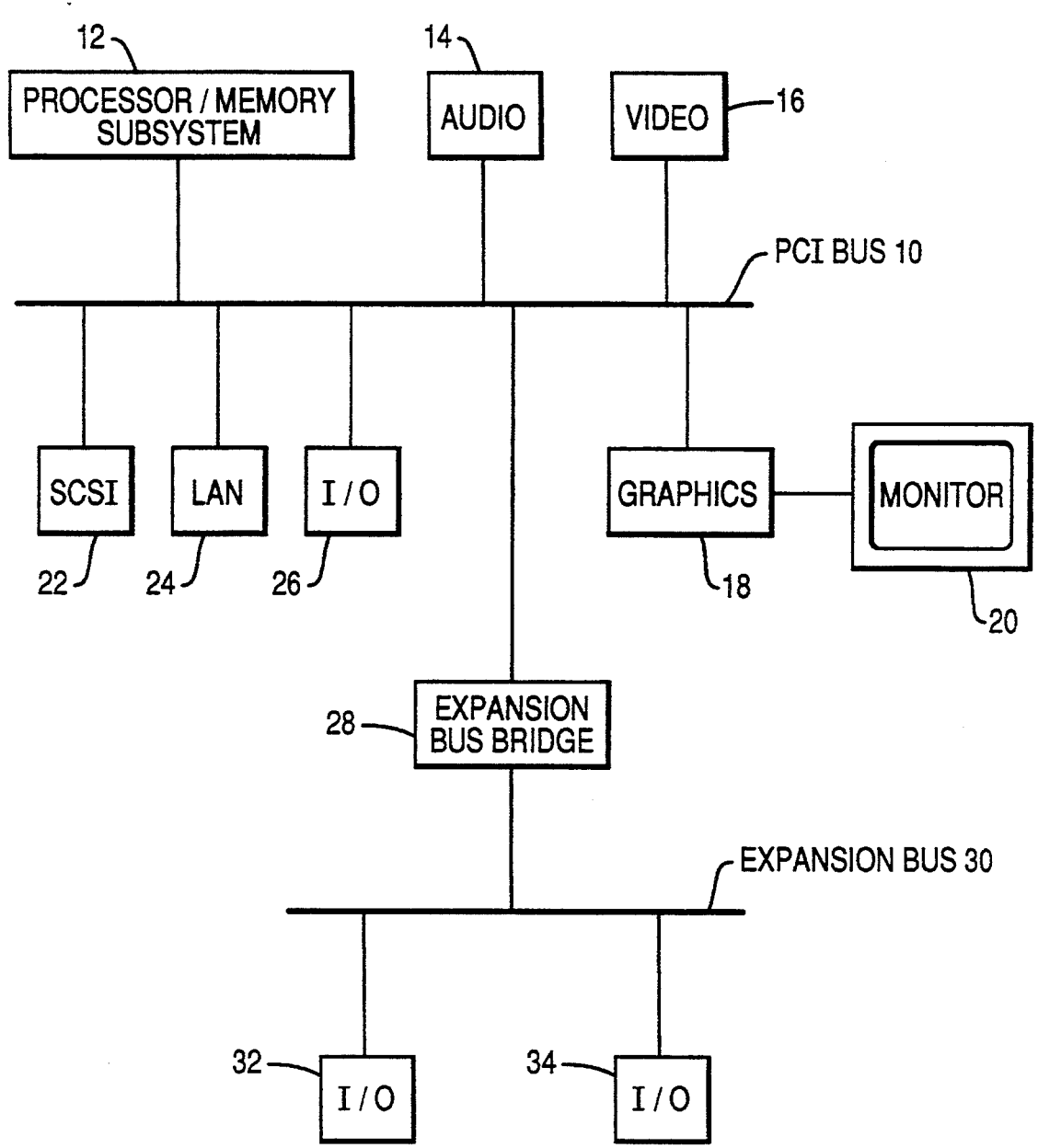
FIG. 1 is a block diagram of an example configuration using the PCI bus.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Introduction

The present application describes several inventive features of an interface or bus for computer systems termed the Peripheral Component Interconnect (PCI). A more complete discussion of the PCI bus is available in the document *Peripheral Component Interconnect (PCI)*, Revision 1.0 Specification, Jun. 22, 1992, incorporated by reference herein.

A PCI bus is a physical interconnect apparatus intended for use between highly integrated peripheral controller components and processor/memory systems. A PCI bus is intended as a standard interface at the component level in much the same way that ISA, EISA, or Micro Channel TM buses are standard interfaces at the board level. Just as ISA, EISA, and Micro Channel TM buses provide a common I/O board interface across different platforms and different processor generations, the PCI bus is intended to be a common I/O component interface across different platforms and different processor generations.

The specification for the PCI bus is intended to standardize a local bus on which a large variety of I/O components can directly connect without "glue" logic, i.e., direct component interconnection. The goal of direct component interconnection results in several advantages:

Electrical driver and frequency specifications within the reach of ASICs and other VLSI devices.

Cost decreases and reliability enhancements due to a lower parts count, smaller power budget, and higher density packaging.

Performance advantages due to a high speed local bus.

A system I/O core design decoupled from the processor/memory treadmill, thus allowing it to survive multiple generations of processor/memory technology.

A manageable protocol providing a large variety of I/O functions with a common physical interface.

PCI Bus "Always On" Protocol

The PCI specification provides a bus protocol mechanism that guarantees that at all times (except for turnaround clocks necessary to prevent contention) the bus is actively driven to a logic 1 or 0 by some device attached thereto. As long as all devices attached to the bus are compliant with the specification, the bus will never be left floating for long intervals, and thus the system designer is free to eliminate the pull-up resistors typically required on other buses.

The elimination of pull-ups on a bus that does not guarantee signals are always driven runs the risk of the bus floating near the switch threshold voltage. This leads to increased power consumption and noise, especially for CMOS devices. The present invention avoids these problems and yet still provides a means for eliminating pull-up resistors, thereby realizing cost savings, space savings on printed circuit boards, as well as reduced power requirements.

RAMBUS Channel Protocol

The RAMBUS specification provides dynamic random access memory (DRAM) architecture and high-speed component interface. The RAMBUS channel is a narrow, high speed 250 MHz bus used to interconnect memory subsystems. One or more DRAMs can be attached to a single RAMBUS channel to form a complete memory subsystem. Using the RAMBUS channel, a single RAMBUS-based DRAM can deliver data at 500 megabytes per second to a processor or other device.

The RAMBUS channel consists of 16 signals and 11 power pins, including nine BUSDATA (Bus Data) signals that are used for transmitting request, read and write packets between devices; a BUSCTRL (Bus Control) signal that is used for framing and acknowledgement packets between devices; a BUSENABLE (Bus Enable) signal that is a control signal used to enable the RAMBUS channel; two CLOCK (Clock) signals provide both transmit and receive clocks; a VREF (Reference Voltage) signal that provides the voltage reference for the channel; SIN and SOUT signals that provide TTL level signals for daisy chain initialization; and eleven Power and Ground signals.

System Description

FIG. 1 is a block diagram of an example configuration using the PCI bus 10. A processor 12 is coupled to the PCI bus 10, as are such peripherals as audio boards 14, video boards 16, video graphics controllers 18 for monitors 20, SCSI peripherals 22, LAN interfaces 24, and other I/O devices 26. Bridge interface logic 28 couples the PCI bus 10 to a standard expansion bus 30 and provides access therebetween for various expansion I/O boards 32, 34. Those skilled in the art will recognize that this example configuration is not intended to imply any specific architectural limits.

In the present invention, a processor 12 may directly access peripheral devices mapped anywhere in the memory or I/O address spaces via a PCI bus 10. Components connected to the PCI bus 10 may be any one of three classes: master, slave, or master-slave combination. Provided these components are all compliant with the PCI specification, the PCI bus 10 becomes a VLSI interconnect, with no "glue" logic necessary. However, if it is necessary to attach components to the bus that are not compliant with the PCI specification, then specialized logic devices can be used to make the connection to the PCI bus.

Signal Definition

Figure 2:
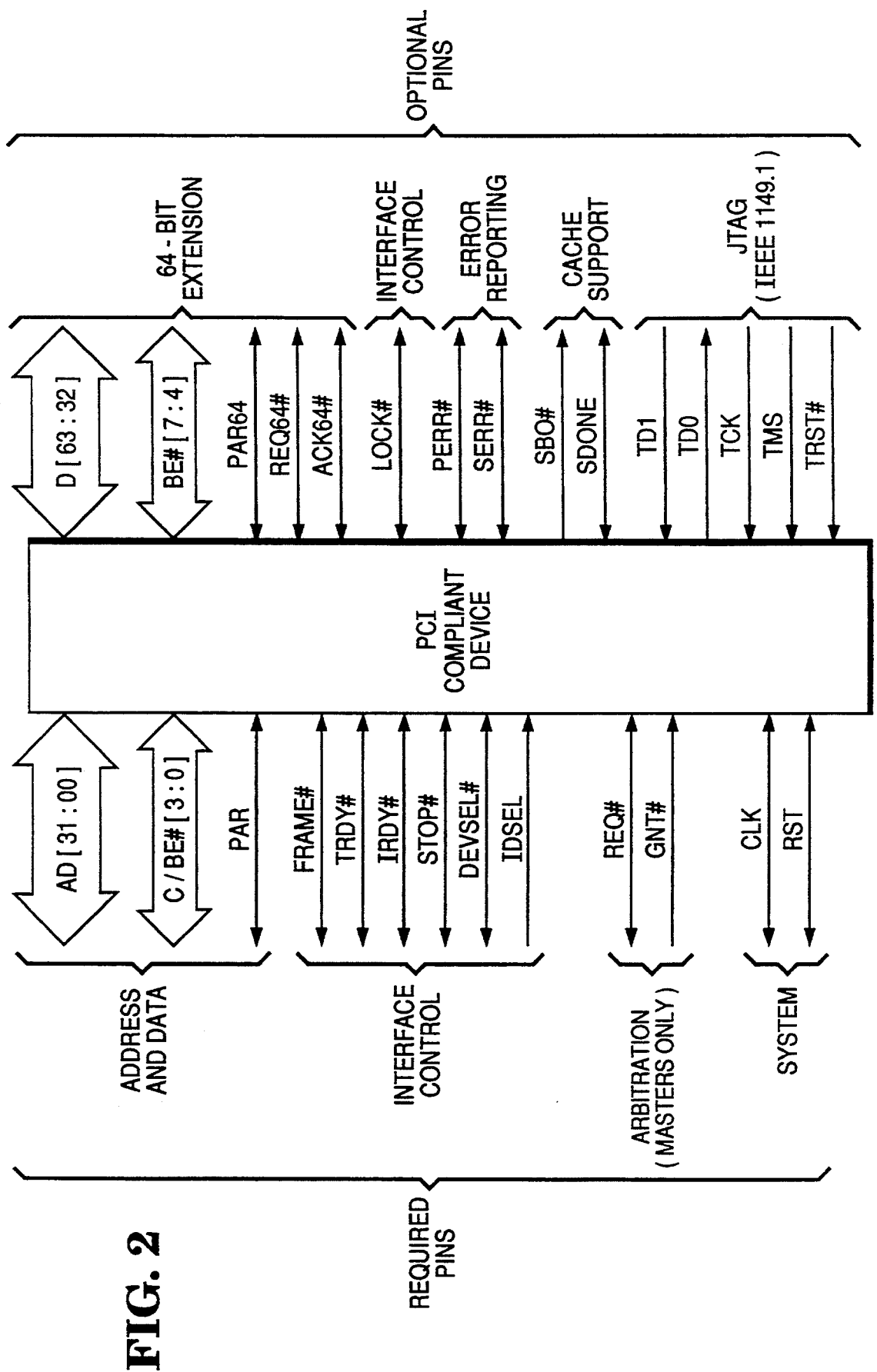
FIG. 2 illustrates the signal definitions of the PCI bus according to the present invention.

FIG. 2 illustrates the signal definitions of the PCI bus according to the present invention. The PCI bus requires a minimum of 45 pins for a slave-only device and 47 pins for a master-only or master-slave device to handle data and addressing, interface control, arbitration, and system functions. Optional error reporting requires two additional pins. The pins in FIG. 2 are shown in functional groups, with required pins on the left side, and optional pins on the right side. The direction indication on the signals in FIG. 2 assumes a combination master-slave device.

A selected subset of the signals are described below in more detail. For more information on the other signals, refer to the document *Peripheral Component Interconnect (PCI)*, Revision 1.0 Specification, Jun. 22, 1992, incorporated by reference herein.

There are certain conventions to the signal names:

1. The # symbol at the end of a signal name indicates that the active state occurs when the signal is at a low voltage; otherwise, the signal is active at a high voltage.
2. The "(in)" symbol indicates a standard input-only signal.
3. The "(out)" symbol indicates a totem pole output, i.e., a standard active driver.
4. The "(t/s)" symbol indicates a tri-state signal, i.e., a bi-directional, tri-state, input/output signal.
5. The "(s/t/s)" symbol indicates a sustained tri-state signal, i.e., an active low tri-state signal owned and driven by one agent at a time. The agent that drives a (s/t/s) signal low must drive it high for at least one clock before letting it float. A new agent cannot start drive a (s/t/s) signal any sooner than one clock after the previous owner tri-states it. A pull-up is required to sustain the inactive state until another agent drives it, and must be provided by a central resource.

System Signals

CLK (in)

The CLK (Clock) signal provides timing for all transactions on the PCI bus and is an input to every device. All other PCI bus signals are sampled on the rising edge of the CLK signal, and all other timing parameters are defined with respect to this edge. It is expected that the PCI bus may operate over a wide range of frequencies for the CLK signal.

AD[31::00] (t/s)

The AD (Address and Data) signals are multiplexed on the same pins of the PCI bus. During the first clock of a transaction, the AD signals contain a 32-bit target device address. During subsequent clocks, the AD signals contain up to 4 bytes of data.

C/BE#[3::0] (t/s)

The C/BE (Bus Command and Byte Enable) signals are multiplexed on the same pins of the PCI bus. During the address phase of a transaction, the C/BE# signals define a bus command. During the data phase of the transaction, the C/BE# signals are used as "Byte Enables" for the 32 AD signals. The Byte Enables determine which byte lanes, i.e., 8-bit groups, of the AD signals carry meaningful data. For example, the C/BE#[0] signal applies to byte 0 of the AD signals, and the C/BE#[3] signal applies to byte 3 of the AD signals.

PAR (t/s)

The PAR (Parity) signal is even parity across AD[31::00] and C/BE#[3::0]. Parity generation is required by all PCI agents. The master drives PAR during address and write data phases; the target drives PAR during read data phases.

Interface Control Signals

FRAME# (s/t/s)

The FRAME# (Cycle Frame) signal is driven by the current master device to indicate the beginning and duration of an access. The FRAME# signal is asserted to indicate a bus transaction is beginning. While the FRAME# signal is asserted, data transfers continue. When the FRAME# signal is de-asserted, the transaction is in the final data phase.

TRDY# (s/t/s)

The TRDY# (Target Ready) signal indicates the target device's ability to complete the current data phase of the transaction. The TRDY# signal is used in conjunction with the IRDY# signal described below. A data phase is completed on any clock where both the TRDY# and IRDY# signals are asserted. During a read, the TRDY# signal indicates that valid data is present on the AD signals. During a write, the TRDY# signal indicates that the target device is prepared to accept data. Wait cycles are inserted until both the IRDY# and TRDY# signals are asserted together.

IRDY# (s/t/s)

The IRDY# (Initiator Ready) signal indicates the initiating agent's (master device's) ability to complete the current data phase of the transaction. The IRDY# signal is used in conjunction with the TRDY# signal. A data phase is completed on any clock that both the IRDY# and TRDY# signals are asserted. During a write, the IRDY# signal indicates that valid data is present on the AD signals. During a read, the IRDY# signal indicates that the master device is prepared to accept data. Wait cycles are inserted until both the IRDY# and TRDY# signals are asserted together.

STOP# (s/t/s)

The STOP# signal indicates the current target is requesting the Master to stop the current transaction.

LOCK# (s/t/s)

The LOCK# signal is an optional signal that indicates an atomic operation that may require multiple transactions to complete. When LOCK# is asserted, nonexclusive transactions may proceed. A grant to start a transaction on PCI does not guarantee control of LOCK#. Control of LOCK# is obtained under its own protocol in conjunction with GNT#. It is possible for different agents to use PCI while a single master retains ownership of LOCK#.

IDSEL (in)

The IDSEL (Initialization Device Select) signal is used as a chip select in lieu of the upper 24 address lines during configuration read and write transactions.

DEVSEL# (s/t/s)

The DEVSEL (Device Select) signal, when actively driven, indicates that the driving device has decoded its address as the target device for the current transaction. As an input, the DEVSEL# signal indicates whether any device on the bus has been selected.

Arbitration (Master Devices Only)

REQ# (out)

The REQ# (Request) signal indicates to a central bus arbiter that the agent desires use of the bus. The REQ# signal is a point-to-point signal, and every master device and master-slave device has its own REQ# signal connection with the arbiter.

GNT# (in)

The GNT# (Grant) signal indicates to the agent that access to the bus has been granted by the arbiter. The GNT# signal is a point-to-point signal, and every master device and master-slave device has its own GNT# signal connection with the arbiter.

64-Bit Bus Extension Pins (Optional)

The 64-bit extension pins are collectively optional. That is, if the 64-bit extension is used, all the pins in this section are required.

D[63::32] (t/s)

The D[63::32] (Data) signals provide 32 additional bits during each data phase when 64-bit transfers occur. These pins are reserved during the address phase.

BE#[7::4] (t/s)

The BE#[7::4] (Byte Enable) signals determine which byte lanes carry meaningful data. During the data phase, the BE#[7::4] signals are used as Byte Enables, e.g., BE#[4] applies to byte 4 and BE#[7] to byte 7. They are reserved during the address phase.

REQ64# (s/t/s)

The REQ64# (Request 64-bit transfer) signal, when actively driven by the current bust master, indicates its desires to transfer data using 64-bits. The REQ64# signal has the same timing as the FRAME# signal.

ACK64# (s/t/s)

The ACK64# (Acknowledge 64-bit transfer) signal, when actively driven by the device that has positively decoded its address as the target of the current access, indicates the target is willing to transfer data using 64-bits. The ACK64# signal has the same timing as the DEVSEL# signal.

PAR64 (t/s)

The PAR64 (Parity Upper Double Word) is the even parity bit that protects the D[63::32] and BE#7::4] signals.

Basic Transaction Control

In order to minimize access latency, the PCI specification uses an arbitration approach to bus transactions the is access-based, rather than time-slot-based. Thus, a master device must arbitrate for each access it performs on the bus.

Preferably, a central arbitration scheme is used, wherein each master device has a unique request (REQ#) and grant (GNT#) signal connected to the central arbiter device. A simple request-grant handshake between the arbiter and the master device is used to gain access to the bus.

A specific arbitration algorithm must be implemented by the arbiter, e.g., priority, rotating priority, fair, etc. An arbitration algorithm must be defined to establish a basis for a worst case latency guarantee. The arbitration occurs during a previous access so that no PCI bus cycles are consumed due to arbitration algorithm. The arbiter can implement any scheme as long as only a single GNT# is asserted on any clock.

A device requests the bus by asserting its REQ# signal. When the arbiter determines a device may use the bus, it asserts the device's GNT# signal. The arbiter may de-assert a device's GNT# signal on any clock. Therefore, a device must insure its GNT# is asserted on the clock edge it wants to start a transaction. If the GNT# signal is de-asserted, then the transaction must not proceed.

The GNT# signal normally gives a device access to the bus for a single transaction. If the device desires another access, it should continue to assert its REQ# signal. A device may de-assert its REQ# signal anytime, but the arbiter may interpret this to mean the device no longer requires use of the bus and may de-assert the device's GNT# signal.

The PCI bus may use "arbitration parking," wherein the arbiter asserts the GNT# signal to a selected device when no device is currently using or requesting the bus. The arbiter can select this default owner any way it wants (e.g., fixed, last used, etc.) or can choose not to park at all, thereby effectively designating itself as the default owner. When the arbiter asserts a device's GNT# signal and the bus is idle, that device must enable its AD and C/BE# signal buffers. This requirement insures the arbiter can safely park the bus at some device and know that the bus will not float. If the arbiter does not park the bus, the central resource device in which the arbiter is embedded typically drives the bus, i.e., effectively designating the central resource device as the default owner of the bus.

If the bus is idle and the arbiter de-asserts a device's GNT# signal, the device has lost access to the bus, except in one case. The one case is when the arbiter de-asserts the GNT# signal coincident with the device asserting the FRAME# signal. In this case, the device will continue the transaction. Otherwise, the device t tri-state the AD and C/BE# signals. The device must disable all buffers in a single clock to avoid possible contention with the next bus owner.

After bus ownership has been granted to a master device, the FRAME# signal is asserted by being driven to a low voltage by the master device to indicate the beginning of the transaction. The first clock edge on which the FRAME# signal is asserted is the address phase, and the address and bus command code are transferred by the AD and C/BE# signals on that clock edge. The next clock edge begins the first of one or more data phases, during which data is transferred by the AD signals between the master device and the target device on each clock edge for which both the IRDY# and TRDY# signals are asserted by the master device and the target device, respectively. Wait cycles may be inserted in a data phase by either the master device or the target device with the IRDY# and TRDY# signals.

At such time as the master device intends to complete only one more data transfer (which could be immediately after the address phase), the FRAME# signal is de-asserted and the IRDY# signal is asserted indicating the master device is ready. After the target device indicates the final data transfer, by asserting the TRDY# signal, the PCI bus returns to the idle state with both the FRAME# and IRDY# signals de-asserted.

Bus Driving and Turnaround

A turn-around-cycle is required on all signals that may be driven by more than one device. The turn-around-cycle is required to avoid contention when one device stops driving a signal and another device begins, and must last at least one clock. This is indicated on the timing diagrams of FIGS. 3 and 4 as two arrows pointing at each others' tail. This turn-around-cycle occurs at different times for different signals. For example, the IRDY#, TRDY# and DEVSEL# signals use the address phase as their turn-around-cycle, while the FRAME#, C/BE# and AD signals use the idle cycle between transactions as their turn-around-cycle. An idle cycle occurs when both the FRAME# and IRDY# signals are de-asserted.

All of the AD signals must be driven to stable values during every address and data phase. In addition, byte lanes of the AD signals not involved in a current data transfer must physically drive stable (albeit meaningless) data onto the bus. The motivation is to keep input buffers on byte lanes not involved in the transfer from switching at the threshold level, and more generally, to facilitate fast metastability free latching. In the interest of minimizing bus switching power consumption, byte lanes not being used in the current bus phase should be driven with the same data as contained in the previous bus phase. The output buffers may have a built-in latch or dynamic flip-flop to capture that data from clock to clock.

Read Transaction

Figure 3:
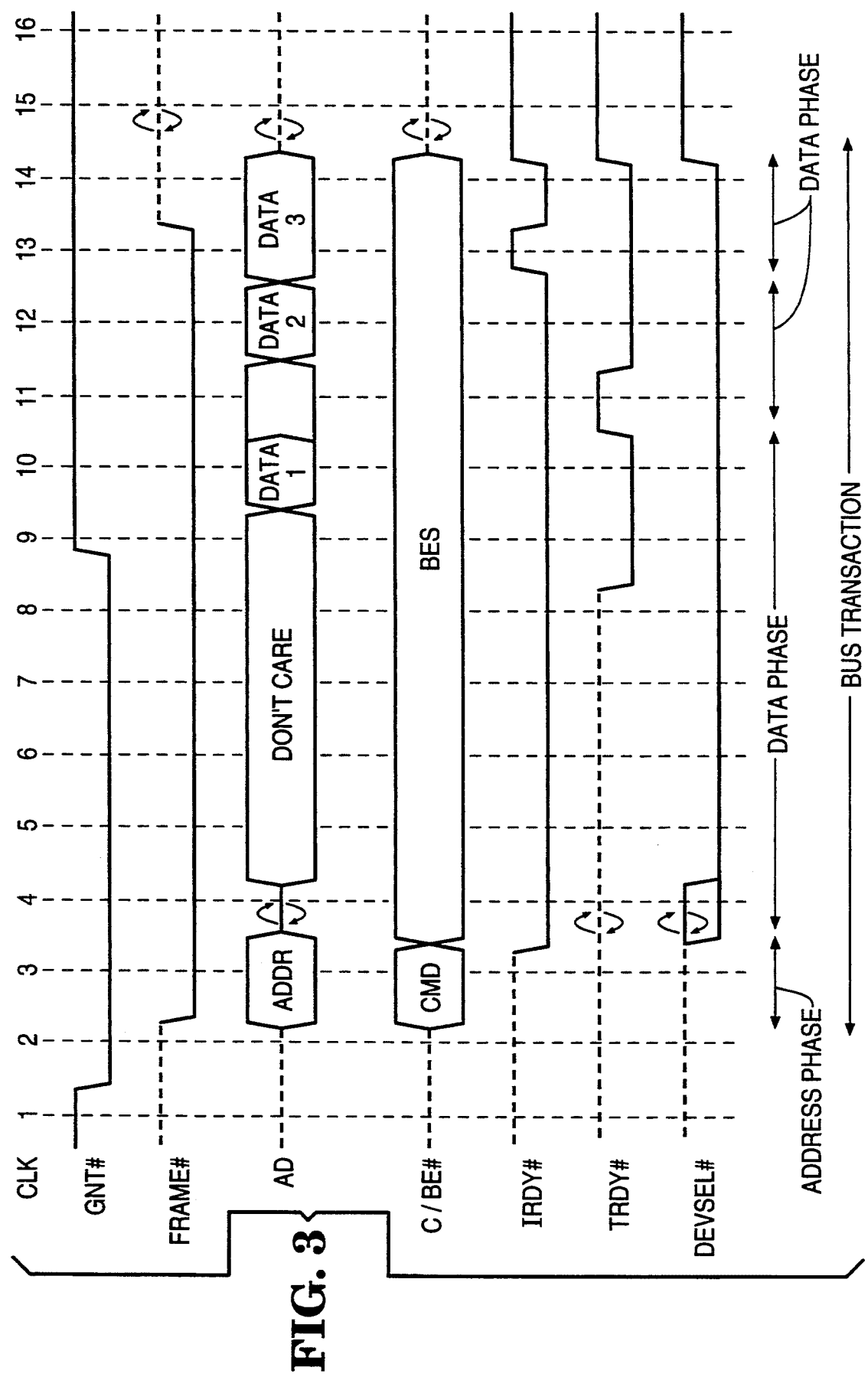
FIG. 3 is a timing diagram illustrating a read transaction on the PCI bus.

FIG. 3 is a timing diagram illustrating a read transaction on the PCI bus. The master device must enable its AD and C/BE# signal drivers when it is granted bus ownership, i.e., after the GNT# signal is asserted by the arbiter. The read transaction starts with an address phase which occurs when the FRAME# signal is asserted for the first time and occurs in clock period 2. The AD signals contain a target device address and the C/BE# signals contain a bus command.

A turn-around-cycle occurs in clock period 3 to avoid contention when the master device stops driving the AD signals and the target device begins driving the AD, TRDY#, and DEVSEL# signals. This is indicated on the timing diagram of FIG. 3 as two arrows pointing at each others' tail. The turn-around-cycle lasts from clock period 3 until clock period 4. The target device must enable its AD signal drivers at clock period 4, as soon as it decodes an address identifying itself as the selected target device of the current cycle, even though it may not supply the requested data on the AD signals for some time. This ensures that, if the bus is stalled waiting for a slow target device to drive requested data onto the bus, that the AD signals are not allowed to float.

The earliest the target device can provide valid data is clock period 9, as enforced by the target device via the TRDY# signal. During the data phase, the C/BE# signals indicate which byte lanes are involved in the current data phase. The C/BE# signal buffers must remain enabled regardless of whether data is transferred to ensure that they are not left floating.

A data phase completes when data is transferred, which occurs when both the IRDY# and TRDY# signals are asserted on the same clock edge. When either signal is de-asserted, a wait cycle is inserted and no data is transferred. As noted in the diagram, data is successfully transferred on clock edges 10, 12, and 14, and wait cycles are inserted on clock edges 11, and 13. The first data phase completes in the minimum time for a read transaction, i.e., from clock edge 9 through clock edge 10. The second data phase is extended on clock edge 11 because the TRDY# signal is de-asserted by the target device to force a wait cycles. The last data phase is extended on clock edge 13 because the IRDY# signal is de-asserted by the master device to force a wait cycle.

The master device knows at clock edge 14 that the next data phase is the last. However, because the master device is not ready to complete the last transfer when the IRDY# signal is de-asserted on clock 13, the FRAME# signal stays asserted. Only when the IRDY# signal is asserted on clock edge 14 can the FRAME# signal be de-asserted, which occurs on clock edge 14.

Write Transaction

Figure 4:
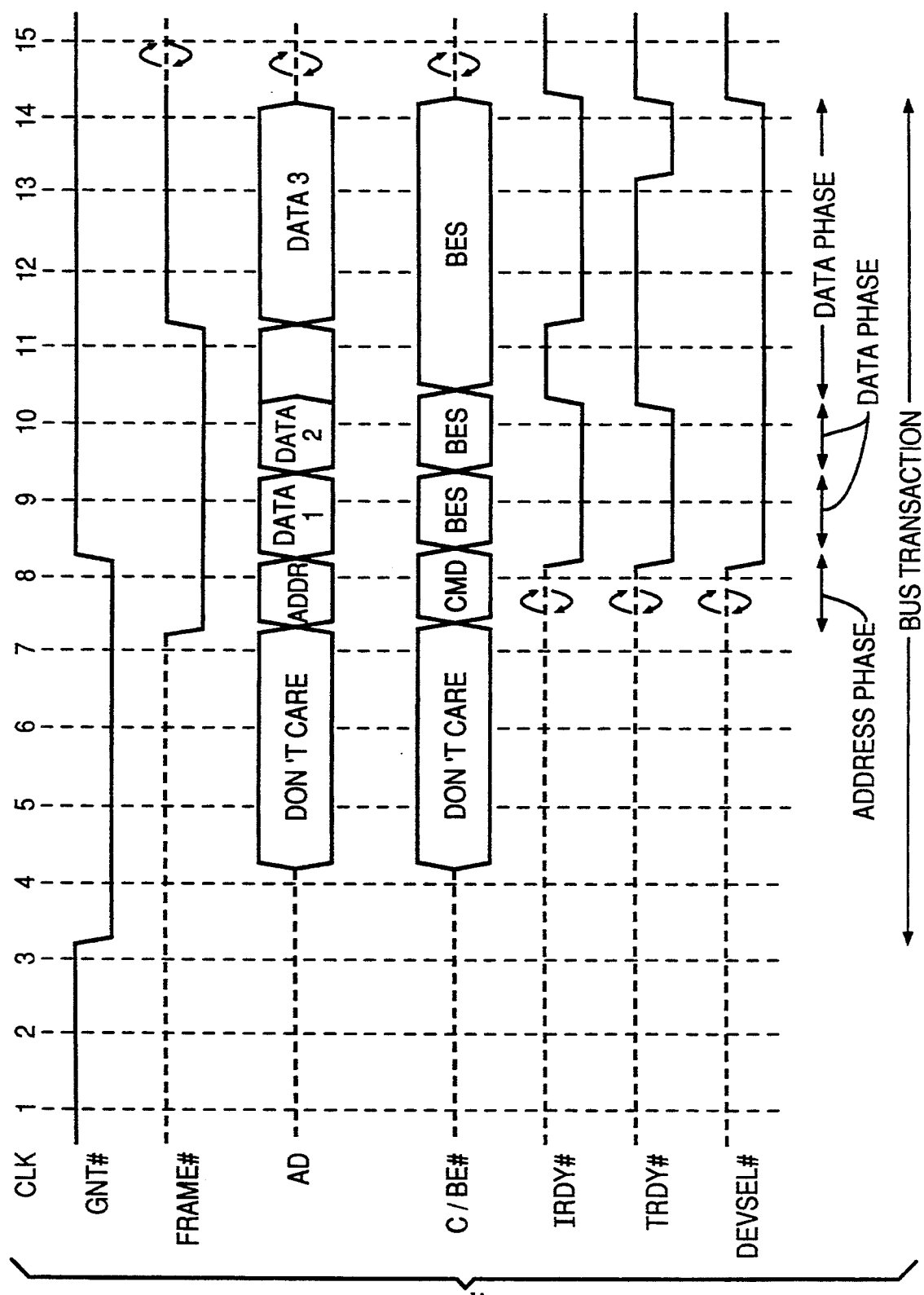
FIG. 4 is a timing diagram illustrating a write transaction on the PCI bus.

FIG. 4 is a timing diagram illustrating a write transaction on the PCI bus. The master device must enable its AD and C/BE# signal drivers when it is granted bus ownership, i.e., when the GNT# signal is asserted by the arbiter. The write transaction starts with an address phase which occurs when the FRAME# signal is asserted for the first time on clock edge 8 at which time the AD signals contain a target device address and the C/BE# signals contain a bus command. A write transaction is similar to a read transaction except that no turn-around-cycle is required following the address phase because the master device drives the AD and C/BE# signals for the entire transaction.

The data phases work the same as in the read transaction. The first and second data phase complete with no wait cycles. However, the third data phase has three wait cycles inserted by the target device. Both devices insert a wait cycle on clock edge 11, and the target device inserts wait cycles on clock edges 12 and 13.

The IRDY# signal must be asserted when the FRAME# signal is de-asserted indicating the last data phase. The data transfer is delayed by the master device on clock edge 11 because the IRDY# signal is de-asserted. Although this allows the master device to delay data, it does not allow the Byte Enables of the AD signals to be delayed. The last data phase is signaled by the master device on clock edge 12, but does not complete until clock edge 14.

Transaction Termination

Termination of a transaction may be initiated by either the master device or the target device. While neither can actually stop the transaction unilaterally, the master device remains in ultimate control, bringing all transactions to an orderly and systematic conclusion regardless of what caused the termination. All transactions are concluded when the FRAME# and IRDY# signals are both de-asserted, thereby indicating an idle cycle.

Because arbitration has occurred during the transaction, the arbiter asserts the GNT# signal to the next selected device before the end of the current transaction. The next selected device waits for the de-assertion of the FRAME# and IRDY# signals to indicate the end of the transaction. At that time, the next selected device must enable its AD and C/BE# signal buffers, thereby ensuring that the bus will not float. Thus, the GNT# signal provides a device with access to the bus for only a single transaction. If the device desires further access to the bus for another transaction, it should continue to assert its REQ# signal for service again by the arbiter.

Multi-Port Processor with PCI Port and RAMBUS Port

FIGS. 5–8 illustrate some example configurations using a PCI bus and RAMBUS channel in a multi-port processor architecture. Those skilled in the art will recognize that these example configurations are not intended to imply any specific architectural limits.

The PCI specification is likely to become a dominant bus standard, in light of its ability to connect processors and peripherals without "glue logic", and its bandwidth, e.g., 132 megabytes per second in 32-bit mode or 264 megabytes per second in 64-bit mode. Further, the RAMBUS channel specification is likely to evolve into a dominant memory interfacing standard, in light of its bandwidth, e.g., 500 megabytes per second at peak, and its low cost due to low pin counts and low voltage signalling. When combined, the PCI bus and RAMBUS channel provide compelling price/performance advantages.

Figure 5:
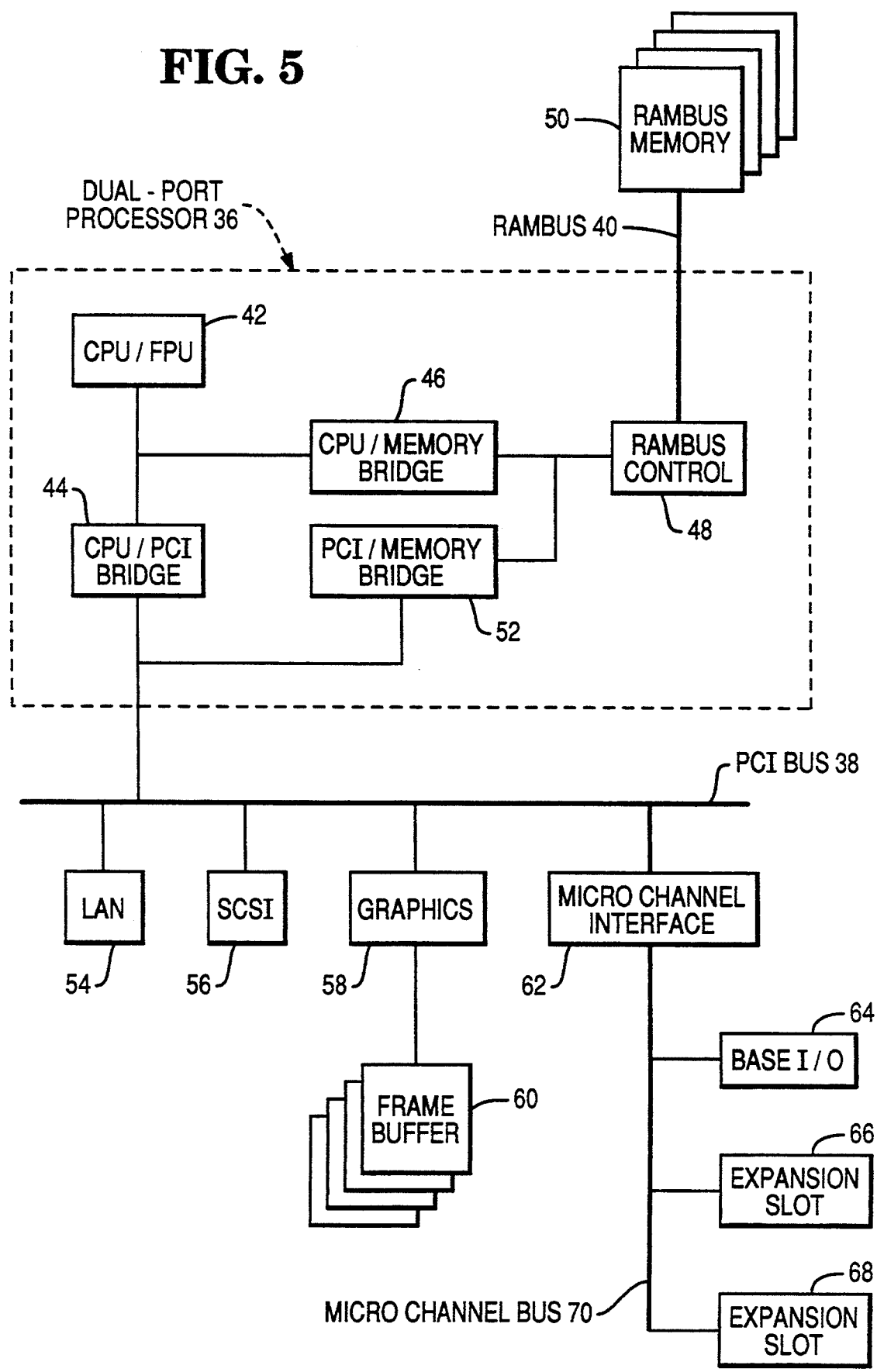
FIGS. 5-8 illustrate some example architectures using the PCI bus and RAMBUS channel in a multiport processor architecture.

FIG. 5 depicts a dual-port processor 36 coupled to a PCI bus 38 and a RAMBUS channel 40. The processor 36 comprises a CPU/FPU 42 coupled to a CPU/PCI bridge 44 for access to the PCI bus 38. The CPU/FPU 42 is also coupled to a CPU/Memory bridge 46 for access to a RAMBUS controller 48. The RAMBUS controller 48 provides access to RAMBUS memory 50 via the RAMBUS 40. The RAMBUS memory 50 is used to implement the system's main memory array. Because the RAMBUS memory 50 connects directly to the processor 36, there is no external memory controller and no external path for PCI bus 38 devices to directly access the main memory 50. The RAMBUS controller 48 is coupled to a PCI/Memory bridge 52 for access from the PCI bus 38. A number of different peripherals are also coupled to the PCI bus 38, including LAN interface 54, SCSI 56, graphics card 58 with framebuffer 60, and Micro Channel TM interface logic 62 for access to a base I/O device 64, expansion slot 66, and expansion slot 68 via a Micro Channel TM bus 70. This multi-port processor design provides the potential for high levels of integration, as well as the potential for all circuits to be housed in inexpensive plastic packaging, thereby providing a high performance, low cost system.

Figure 6:
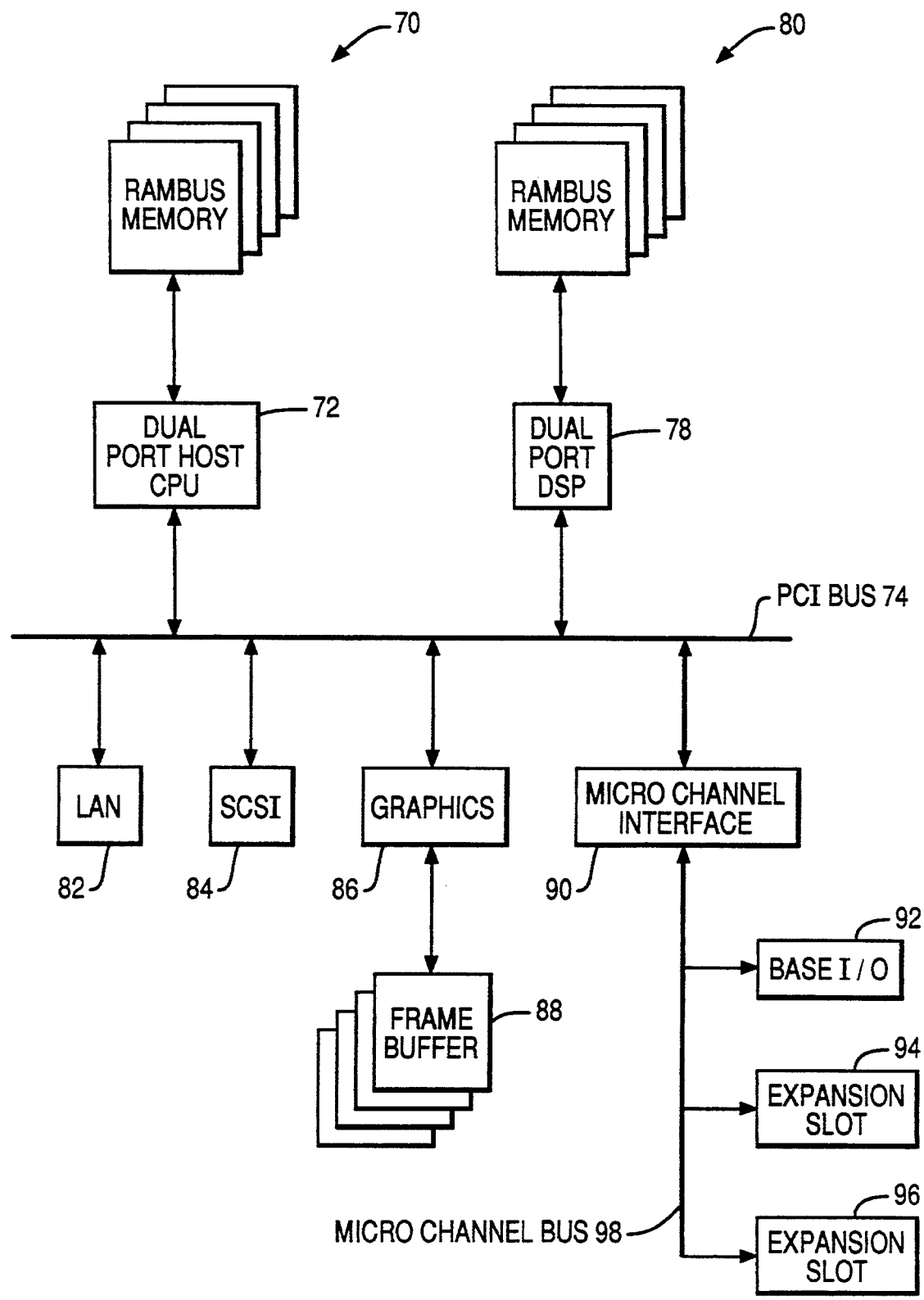

FIG. 6 depicts a dual-port CPU 72 coupled to a PCI bus 74 and a RAMBUS memory 76, as well as a dual-ported DSP 78 coupled to the PCI bus 74 and a RAMBUS memory 80. The DSP 78 uses the RAMBUS memory 80 for real-time data storage, thereby allowing the DSP 78 to run decoupled from the CPU 72 without causing a bandwidth drain on the RAMBUS memory 76 coupled to the CPU 72. A number of different peripherals are also coupled to the PCI bus 74, including LAN interface 82, SCSI 84, graphics card 86 with frame buffer 88, and Micro Channel TM interface logic 90 for access to a base I/O device 92, expansion slot 94, and expansion slot 96 via a Micro Channel TM bus 98. This multi-port processor design provides the potential for inexpensively adding multimedia functions, faxes, modems, etc., to PC and work station platforms.

Figure 7:
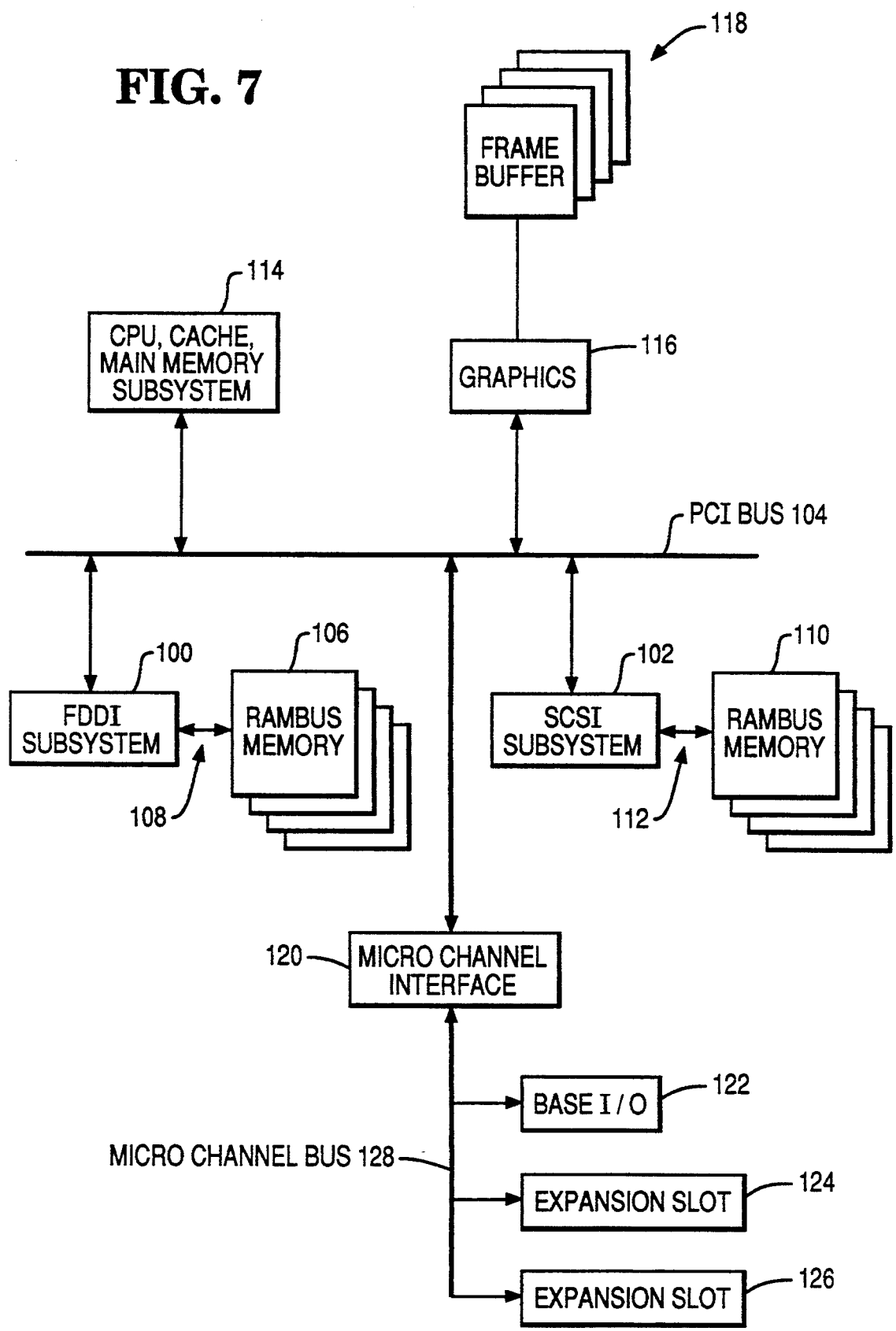

FIG. 7 depicts a tri-port FDDI subsystem 100 and a tri-port SCSI subsystem 102 coupled to a PCI bus 104.

The FDDI subsystem 100 comprises a processor coupled to memory arrays 106 via a RAMBUS channel 108. The SCSI subsystem 102 also comprises a processor coupled to memory arrays 110 via a RAMBUS channel 112. The memory arrays 106 and 110 can serve as scratch-pad data storage for intelligent I/O co-processors, and for data buffering purposes for other peripherals, e.g., LAN transmit/receive buffers, disk cache, etc. Even with three ports, the pin efficiency of the PCI bus 104 and the RAMBUS channels 108 and 112 makes such devices achievable in low pin count plastic packages. In addition, FIG. 7 also includes a single-port CPU/Cache/Main Memory subsystem 114, a single-port graphics card 116 with frame buffers 118, and Micro Channel TM interface logic 120 for access to a base I/O device 122, expansion slot 124, and expansion slot 126 via a Micro Channel TM bus 128.

Figure 8:
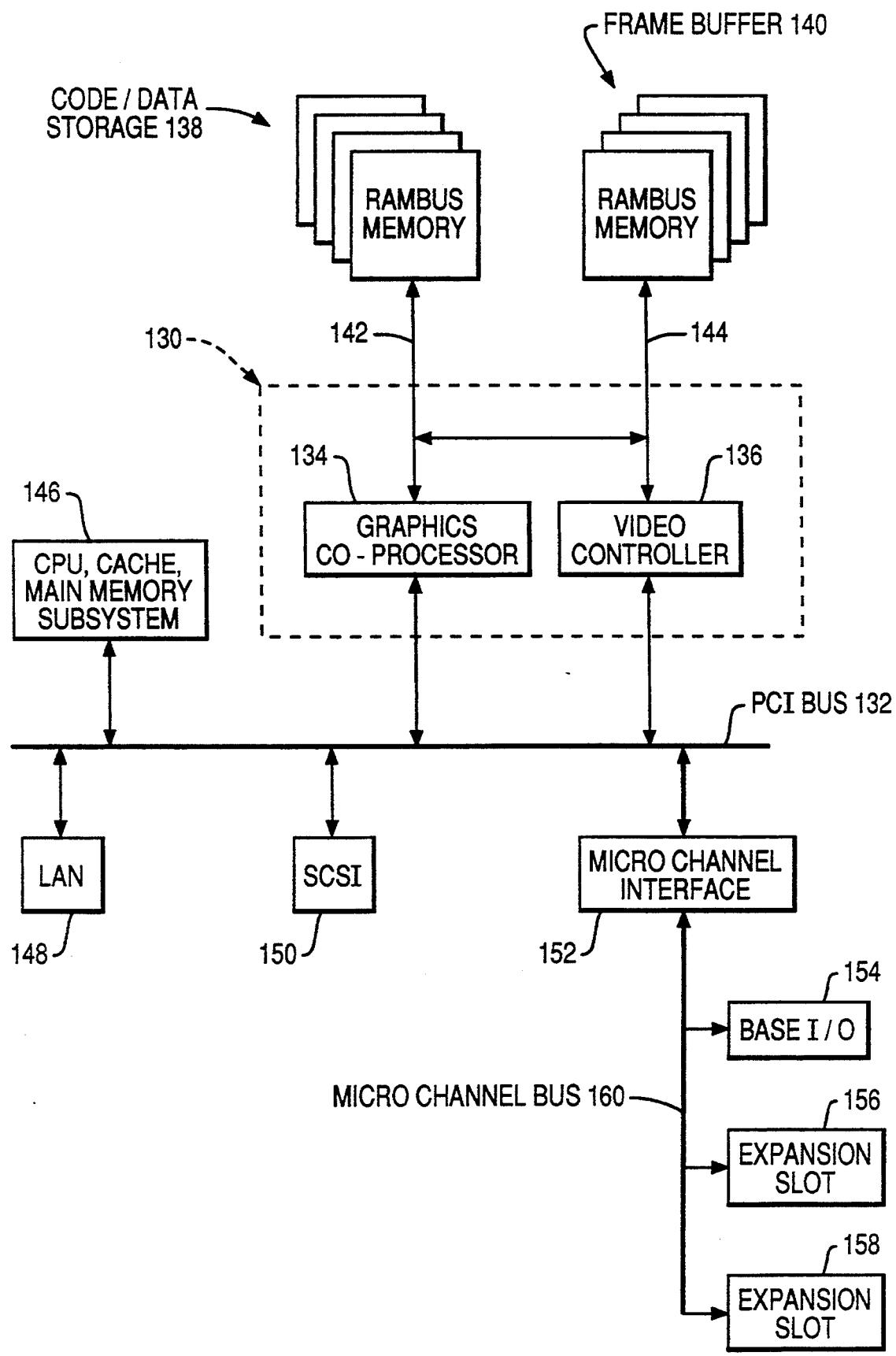

FIG. 8 depicts a tri-port subsystem 130 coupled to a PCI bus 132. The subsystem 130 comprises a graphics co-processor 134 and a video controller 136 coupled to memory arrays 138 and 140 via RAMBUS channels 142 and 144, respectively. The memory arrays 138 and 140 can serve as code/data storage and frame buffers, respectively, for the co-processor 134 and controller 136. The separate frame buffer 140 allows the co-processor 134 to access its data storage 138 while the controller 136 retrieves data from the frame buffer 140 for screen refresh. In addition, FIG. 8 also includes a single-port CPU/Cache/Main Memory subsystem 146, a single-port SCSI interface 150, and Micro Channel TM interface logic 152 for access to a base I/O device 154, expansion slot 156, and expansion slot 158 via a Micro Channel TM bus 160.

As can be seen, the use of the PCI bus and the RAMBUS channel creates unique possibilities for PC or work station architectures. The recurring theme is the ability to implement concurrent, multi-port architectures using high performance, pin efficient buses, wherein the level of integration is high and the cost is low. Those skilled in the art will recognize that these example configurations are not intended to imply any specific architectural limits.

Conclusion

In summary, a Peripheral Component Interconnect (PCI) bus has been described for component level interconnection of processors, peripherals and memories. This interconnect lends itself to dual-port processor architectures using a PCI bus for I/O devices and a RAMBUS channel for main or secondary memory. The PCI bus includes a protocol that guarantees that at all times, except for turn-around clocks necessary to prevent contention, that the bus is actively driven to a logic 1 or 0 by some device attached thereto. As long as all devices attached to the bus are compliant with the specification, the bus will never be left floating for long intervals, and thus the system designer is free to eliminate the pull-up resistors typically required on other buses.

The foregoing description of the preferred embodiment of the present invention has been presented only for the purposes of illustration and description. The foregoing description is not intended to be exhaustive or to limit the invention to the precise form disclosed. Many modifications and variations are possible in light of the teaching herein. For example, the following paragraphs describe some alternatives in accomplishing the same invention.

Those skilled in the art will recognize that the present invention is applicable to systems with different configurations of devices and components. The example configurations of devices and components cited in the present specification are for illustrative purposes only and are not intended to be exhaustive or to limit the invention to the precise form disclosed.

Those skilled in the art will recognize that the present invention is applicable to buses with different pin counts and different signal definitions. The pin counts and signal definitions cited in the present specification are for illustrative purposes only and are not intended to be exhaustive or to limit the invention to the precise form disclosed.

Those skilled in the art will recognize that the present invention is applicable to buses with different electrical characteristics. The electrical characteristics cited in the present specification are for illustrative purposes only and are not intended to be exhaustive or to limit the invention to the precise form disclosed.

Those skilled in the art will recognize that the present invention is applicable to buses with different transaction types, including transactions with different functional sequences. The transactions cited in the present specification are for illustrative purposes only and are not intended to be exhaustive or to limit the invention to the precise form disclosed.

It is intended that the scope of the invention be limited not by this detailed description, but rather by the claims appended hereto.

What is claimed is:
1. A computer system, comprising:
 (a) a processor having first and second ports;
 (b) a RAMBUS channel, coupled to the first port of the processor and to a memory, for communicating electrical signals therebetween, wherein the RAMBUS channel is a high speed bus used to attach one or more memory devices to the processor as a memory subsystem;
 (c) a bus, coupled to the second port of the processor and to one or more electronic devices, for communicating electrical signals therebetween; and
 (d) a central arbiter device, coupled to the processor and the electronic devices, for selecting by arbitration a first device coupled to the bus for actively and exclusively driving a specific electrically conductive signal connection of the bus to a logic 1 or 0 value during a first time period, and for selecting by arbitration a second device coupled to the bus for actively and exclusively driving the specific electrically conductive signal connection of the bus to a logic 1 or 0 value during a second time period following the first time period, so that the specific electrical conductive signal connection of the bus is never let floating for an extended period of time, each device that requests exclusive control of the bus having a request signal line and grant signal line connected to the central arbiter device, the request signal line indicating to the central arbiter device that the device desires use of the bus, and the grant signal line indicating to the device that access to the bus has been granted by the central arbiter device, wherein the central arbiter device further comprises arbiter parking means for asserting the grant signal line to a selected device not requesting access to the bus when no other device is requesting access to the bus, thereby effectively designat- ing the selected device as a default owner of the bus, so that the bus will not float.

2. The invention as set forth in claim 1 above, wherein the electrically conductive signal connections comprise a plurality of signal lines for device addressing, data transfer, bus control, bus arbitration, and system functions.

3. The invention as set forth in claim 1 above, wherein a turnaround time period exists between the first and second time periods to prevent contention between the first and second devices for the electrically conductive signal connection.

4. The invention as set forth in claim 3 above, wherein the turnaround time period last is a clock period or less.

5. The invention as set forth in claim 1 above, wherein the device must enable one or more output buffers to one or more of the electrically conductive signal connections when the central arbiter device asserts the grant signal to the device, thereby ensuring that the electrically conductive signal connection will not float.

6. The invention as set forth in claim 1 above, wherein the central arbiter device further comprises means for selecting by arbitration a device for a next access during a previous access so that no bus cycles are consumed thereby.

7. The invention as set forth in claim 1 above, wherein each device further comprises means for requesting bus access by asserting a request signal from the device, and the central arbiter device further comprises means for asserting the grant signal to the device when it determines the device may access the bus.

8. The Invention as set forth in claim 7 above, wherein the central arbiter device further comprises means for de-asserting the grant signal to the device to indicate that the device has lost access to the bus.

9. The invention as set forth in claim 1 above, wherein the central arbiter device further comprises means for selecting by arbitration the first and second devices for a single transaction on the bus.

10. A method of communicating between a processor, a memory, and peripheral devices in a computer system, comprising the steps of:
    (a) communicating electrical signals between a processor and a memory on a RAMBUS channel coupled to a first port of the processor and to the memory, wherein the RAMBUS channel is a high speed bus used to attach one or more memory devices to the processor as a memory subsystem;
    (b) communicating electrical signals between the processor and one or more peripheral devices on a bus coupled to a second port of the processor and to the peripheral devices, wherein each device that requests exclusive control of the bus has a request signal line and grant signal line connected to a central arbiter device, the request signal line indicating to the central arbiter device that the device desires use of the bus, and the grant signal line indicating to the device that access to the bus has been granted by the central arbiter device;
    (c) selecting by arbitration a first device coupled to the bus for actively and exclusively driving a specific electrically conductive signal connection of the bus to a logic 1 or 0 value during a first time period, and selecting by arbitration a second device coupled to the bus for actively and exclusively driving the specific electrically conductive signal connection of the bus to a logic 1 or 0 value during a second time period following the first time period, so that the specific electrical conductive signal connection of the bus is never left floating for an extended period of time; and
    (d) arbitration parking the bus, comprising the step of asserting the grant signal line to a selected device not requesting access to the bus when no other device is requesting access to the bus, thereby effectively designating the selected device as a default owner of the bus, so that the bus will not float.

11. The invention as set forth in claim 10 above, wherein the electrically conductive signal connections comprise a plurality of signal lines for device addressing, data transfer, bus control, bus arbitration, and system functions.

12. The invention as set forth in claim 10 above, further comprising the step of preventing contention between the first and second devices for the electrically conductive signal connection by providing a turnaround time period between the first and second time periods.

13. The invention as set forth in claim 12 above, wherein the turnaround time period lasts a clock period or less.

14. The invention as set forth in claim 10 above, further comprising the step of enabling one or more of the device's output buffers to one or more of the electrically conductive signal connections after the grant signal is asserted to the device, thereby ensuring that the electrically conductive signal connection will not float.

15. The invention as set forth in claim 10 above, further comprising the step of selecting by arbitration a device for a next access during a previous access so that no bus cycles are consumed thereby.

16. The invention as set forth in claim 10 above, further comprising the steps of requesting bus access by asserting a request signal from the device and granting bus access by asserting a grant signal to the device.

17. The invention as set forth in claim 10 above, wherein the selecting step further comprises the step of selecting by arbitration the first and second devices for a single transaction on the bus.

18. The invention as set forth in claim 10 above, further comprising the step of de-asserting a grant signal to the device to indicate that the device has lost access to the bus.

* * * * *

UNITED STATES PATENT AND TRADEMARK OFFICE
CERTIFICATE OF CORRECTION

PATENT NO. : 5,392,407
DATED : February 21, 1995
INVENTOR(S) : Thomas F. Heil, et al It is certified that error appears in the above-indentified patent and that said Letters Patent is hereby corrected as shown below:

Column 13, line 14, delete "last is" and insert --lasts --.

Signed and Sealed this

Eighth Day of August, 1995

Attest:

BRUCE LEHMAN

Attesting Officer

Commissioner of Patents and Trademarks